United States Patent
Klapper

(10) Patent No.: US 10,913,640 B2
(45) Date of Patent: Feb. 9, 2021

(54) CABLE WINCH ARRANGEMENT

(71) Applicant: Hans Künz GmbH, Hard (AT)

(72) Inventor: Georg Klapper, Hard (AT)

(73) Assignee: Hans Künz GmbH, Hard (AT)

(*) Notice: Subject to any disclaimer, the term of this patent is extended or adjusted under 35 U.S.C. 154(b) by 227 days.

(21) Appl. No.: 16/026,470

(22) Filed: Jul. 3, 2018

(65) Prior Publication Data
US 2019/0010030 A1    Jan. 10, 2019

(30) Foreign Application Priority Data

Jul. 5, 2017  (AT) ................. GM154/2017

(51) Int. Cl.
| *B66D 1/39* | (2006.01) |
| *E02B 8/02* | (2006.01) |
| *B66C 11/16* | (2006.01) |
| *B08B 1/00* | (2006.01) |

(Continued)

(52) U.S. Cl.
CPC ............. *B66D 1/39* (2013.01); *B08B 1/001* (2013.01); *B08B 1/008* (2013.01); *B66C 11/16* (2013.01); *B66C 19/00* (2013.01); *B66C 19/002* (2013.01); *B66C 19/007* (2013.01); *E02B 8/02* (2013.01); *E02B 8/026* (2013.01); *E02B 9/00* (2013.01); *B66C 2700/012* (2013.01)

(58) Field of Classification Search
CPC ... B66D 1/26; B66D 1/39; B66D 3/26; B66D 2700/0175; B08B 1/008; B08B 1/001; B66C 11/16; E02B 8/02; E02B 8/026; E02B 9/00

USPC .......................... 254/278, 294, 331
See application file for complete search history.

(56) References Cited

U.S. PATENT DOCUMENTS

| 652,893 | A | * | 7/1900 | Herdman | ................. | B66D 3/24 |
| | | | | | | 254/276 |
| 1,221,975 | A | * | 4/1917 | Cuff | ....................... | B65H 54/54 |
| | | | | | | 242/399.1 |
| 1,866,911 | A | | 7/1932 | Schroeder | | |

(Continued)

FOREIGN PATENT DOCUMENTS

| BE | 569613 | 8/1958 |
| CH | 243432 | 7/1946 |

(Continued)

OTHER PUBLICATIONS

Machine Translation of BE 569,613. (Year: 1958).*
Machine Translation of CH 243,432. (Year: 1946).*

*Primary Examiner* — Michael R Mansen
*Assistant Examiner* — Juan J Campos, Jr.
(74) *Attorney, Agent, or Firm* — Volpe Koenig

(57) ABSTRACT

A cable winch arrangement (1) which includes at least one cable drum (2), which is mounted rotatably about a drum axis (3), for winding up and/or unwinding at least one cable (30-37), and a supporting structure (20), and a spindle drive (14) for displacing the cable drum (2) relative to the supporting structure (20), wherein the spindle drive (14) has a spindle (16) extending along a spindle axis (15), and a cable run-off point (6) of the at least one cable (30-37), at which the cable (30-37) runs tangentially onto and/or out from the cable drum (2), is at least substantially positionally fixed with respect to the supporting structure (20), and the spindle axis (15) is arranged coaxially with respect to the drum axis (3) of the cable drum (2).

18 Claims, 10 Drawing Sheets

(51) Int. Cl.
*E02B 9/00* (2006.01)
*B66C 19/00* (2006.01)

(56) References Cited

U.S. PATENT DOCUMENTS

| | | | | |
|---|---|---|---|---|
| 2,659,573 | A | * 11/1953 | Smith, Sr. .......... | A62B 35/0093 |
| | | | | 242/379.1 |
| 5,718,771 | A | 2/1998 | Cassell et al. | |
| 9,783,399 | B2 * | 10/2017 | Hausladen ............... | B66D 1/30 |
| 2012/0193315 | A1 | 8/2012 | Noll | |
| 2017/0203939 | A1 | 7/2017 | Hamann et al. | |

FOREIGN PATENT DOCUMENTS

| | | |
|---|---|---|
| CN | 102285603 | 12/2011 |
| DE | 8710351 | 1/1988 |
| DE | 10135034 | 10/2002 |
| EP | 3196162 | 7/2017 |
| GB | 909340 | 10/1962 |
| GB | 2183212 | 6/1987 |
| WO | 2006047798 | 5/2006 |

* cited by examiner

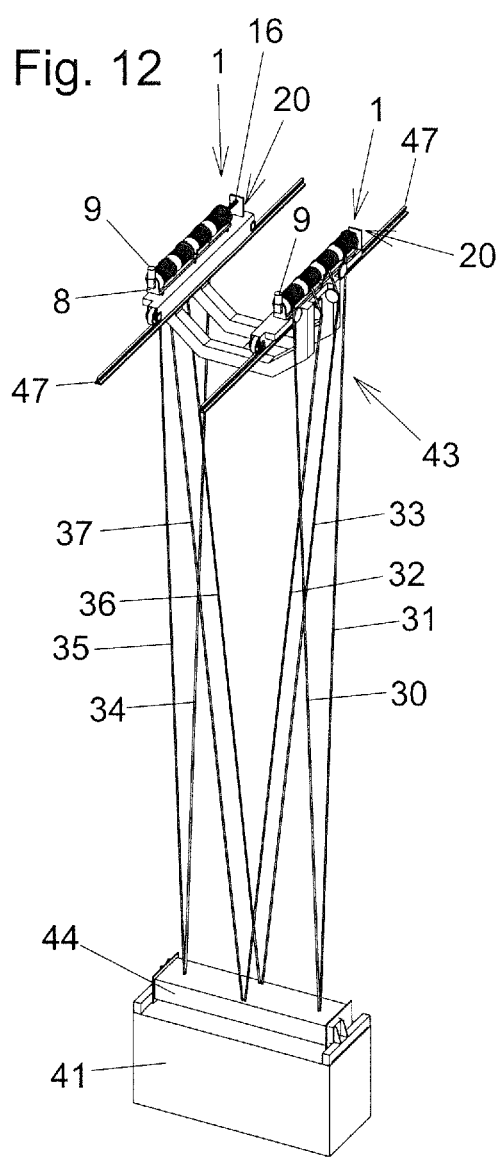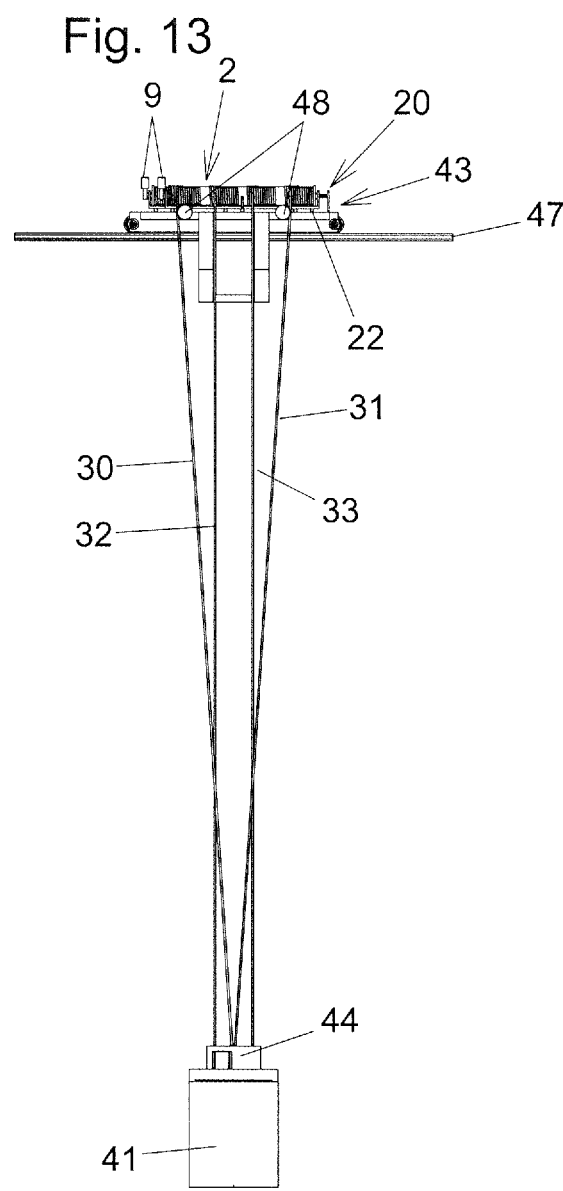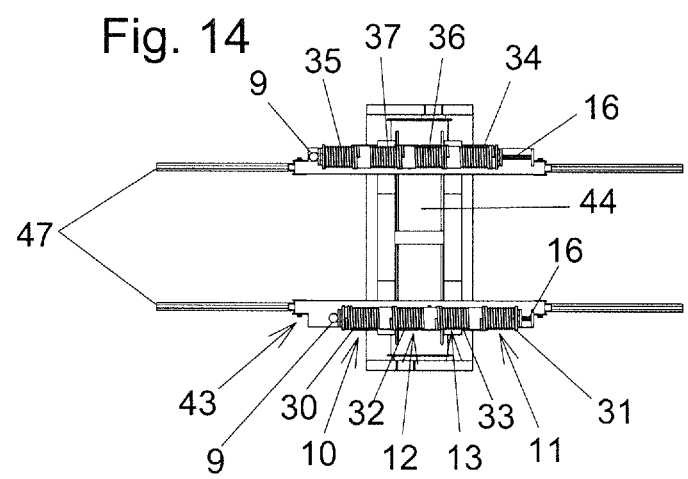

Fig. 15
Fig. 17
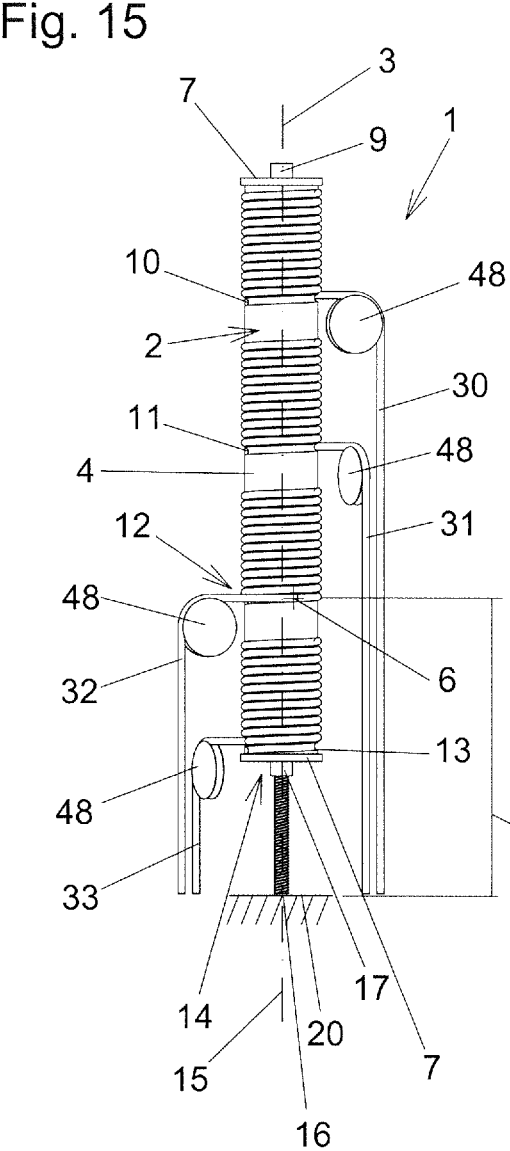
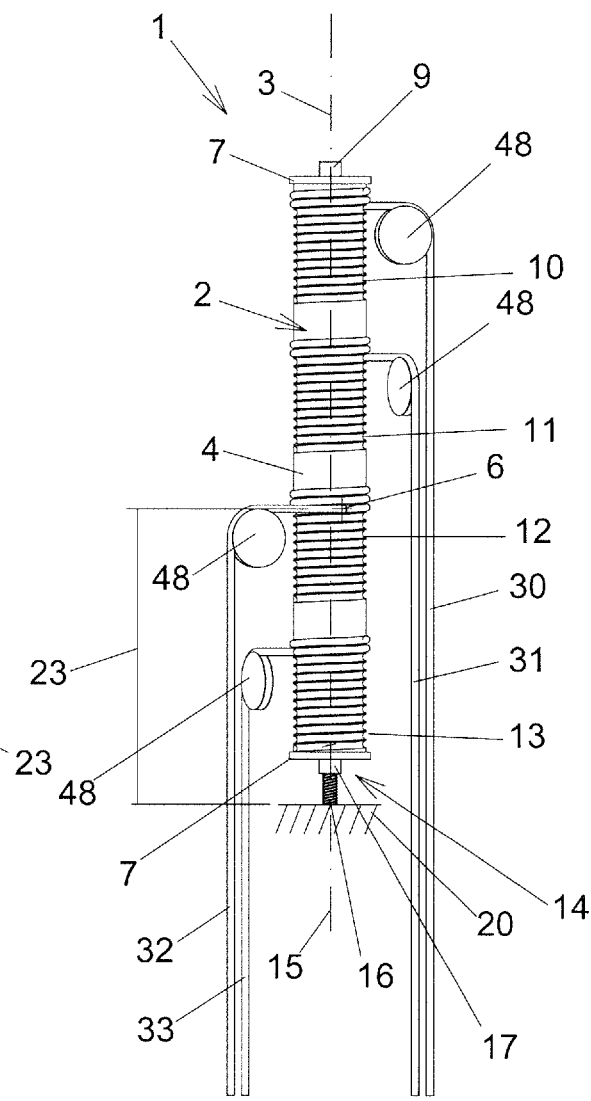
Fig. 16
Fig. 18
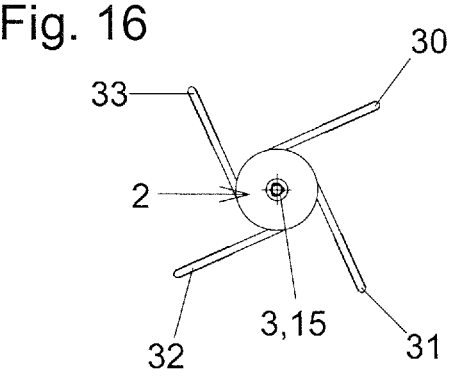
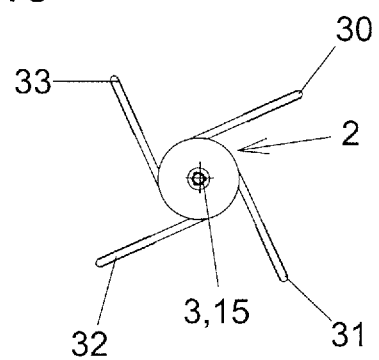

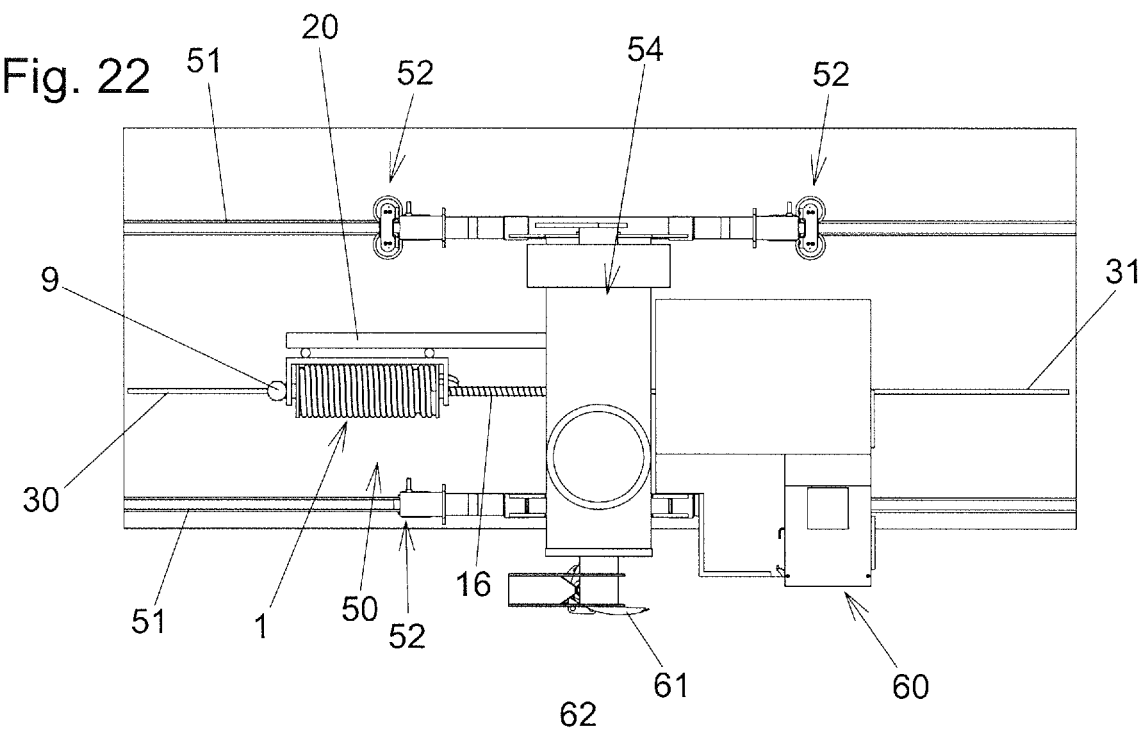
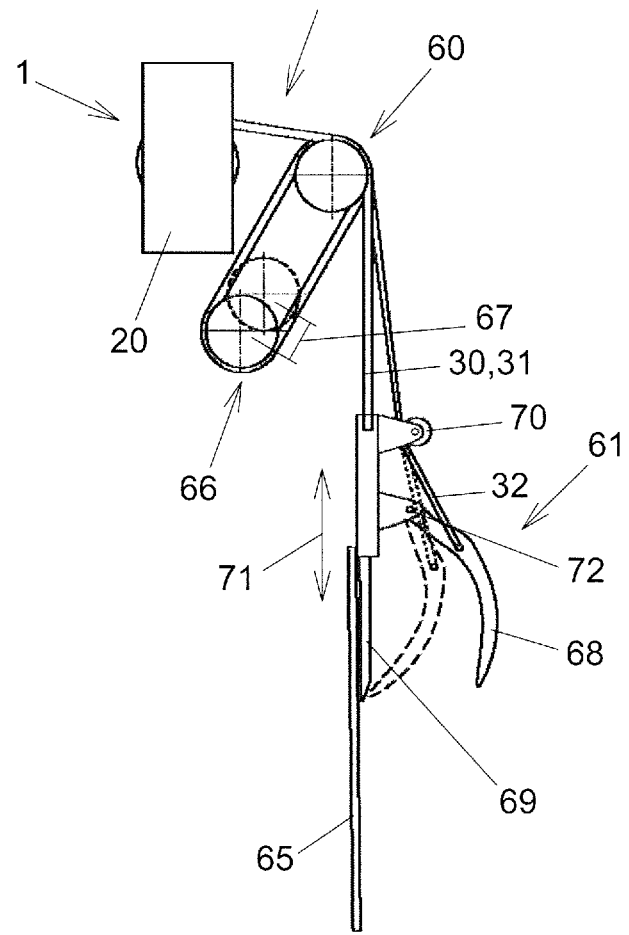

CABLE WINCH ARRANGEMENT

INCORPORATION BY REFERENCE

The following documents are incorporated herein by reference as if fully set forth: Austrian Application GM 154/2017, filed Jul. 5, 2017,

BACKGROUND

The present invention relates to a cable winch arrangement which comprises at least one cable drum, which is mounted rotatably about a drum axis, for winding up and/or unwinding at least one cable, and a supporting structure, and a spindle drive for displacing the cable drum relative to the supporting structure, wherein the spindle drive has a spindle extending along a spindle axis, and a cable run-off point of the at least one cable, at which the cable runs tangentially onto and/or out from the cable drum, is at least substantially positionally fixed with respect to the supporting structure. Furthermore, the invention relates to a crane, to a travel drive with at least one cable winch arrangement, and to a screen-cleaning apparatus.

Diverse embodiments of cable winch arrangements are used for winding up and/or unwinding at least one cable, wherein the at least one cable is generally wound up onto a circular-cylindrical cable drum, which is also called a winch, and/or unwound from the cable drum. The at least one cable is generally windable or wound up on the cable drum spirally, in particular helically or helicoidally. It is characteristic of customary cable winch arrangements for the cable run-off point of the at least one cable, at which the cable runs tangentially onto or out from the cable drum, to be changeable in position. That is to say, the cable run-off point moves along a direction parallel to the drum axis of the cable drum during the winding up or unwinding of the cable. This movement could also be referred to as a "migration" of the cable run-off point on a drum casing of the cable drum during the rotation of the cable drum. The "migration" of the cable run-off point along the drum casing of the cable drum leads to a freely hanging cable end of a cable, which is wound up in sections on the cable drum and to which, for example, a load is fastened, moving along with the cable run-off point parallel to the drum axis, and therefore, during the lifting or lowering movement of the cable, a, generally undesirable, superimposed displacement of the load in a direction parallel to the drum axis occurs at the same time.

In order to steer the at least one cable running out from the cable drum in a predetermined direction, cable pulleys are frequently used. Cable pulleys have an encircling cable groove in which the cable is guided. An essential parameter of a cable pulley is the lateral striking angle of the cable during the running of the cable into or out of the cable groove of the cable pulley. The lateral striking angle is that angle of the lateral deflection of the cable with respect to a groove plane in which the cable groove of the cable pulley is arranged. A large lateral striking angle, e.g. more than 4°, has a considerable influence on the service life of the cable. In order to limit the lateral striking angle, cable pulleys therefore have to be arranged at a relatively large distance from the cable drum.

The document DE 101 35 034 C1 discloses a cable winch arrangement with a displacement unit which displaces the cable drum longitudinally synchronously with the winding up and unwinding of the cables in such a manner that the respective cable run-off points are in each case always located at the same point with respect to a lifting mechanism frame. As a result, the lateral striking angle of the cable on the respective cable pulley can be kept constant. In one possible variant embodiment, the displacement unit has a threaded spindle drive for displacing the cable drum, wherein the threaded spindle drive is coupled to the cable drum axis via a toothed belt.

SUMMARY

It is the object of the invention to provide an advantageous cable winch arrangement of the type mentioned at the beginning, which can be designed in a simple manner.

This is achieved by a cable winch arrangement with one or more features of the invention.

In the case of the cable winch arrangement according to the invention, it is provided that the spindle axis is arranged coaxially with respect to the drum axis of the cable drum. That is to say that the spindle axis lies on a common axis with the drum axis of the cable drum. A simple construction of the cable winch arrangement can thereby be realized.

Within the context of the invention, the spindle drive is a helical gearing. In particular, the spindle drive according to the invention can be a trapezoidal screw drive, a ball screw drive, a roller screw drive with a roller return, a planetary roller screw drive, a quick-acting screw drive, etc. The spindle drive connects the supporting structure to the cable drum, wherein an adjustment of the spindle drive leads to a relative displacement of the cable drum in relation to the supporting structure. The spindle drive is adjusted here in the direction of the spindle axis. Since the drum axis of the cable drum is arranged coaxially with respect to the spindle axis, the relative displacement of the cable drum in relation to the supporting structure likewise takes place in a direction parallel to the drum axis or to the spindle axis.

The expression according to which the cable run-off point is "at least substantially positionally fixed" means that the cable run-off point is at least substantially immovable with respect to the supporting structure during the winding up or unwinding of the cable. The cable run-off point refers in particular to the point at which a longitudinal center axis of the cable merges from a helical orientation—which a portion of the cable wound up on the cable drum takes up—in a tangential direction—with respect to the drum casing of the cable drum. The cable run-off point could also be referred to as a cable run-on point or as a cable run-on and run-off point. In this connection, the expression "at least substantially" means that the cable run-off point advantageously moves parallel to the drum axis by less than the value of a cable diameter of the cable between a completely unwound state of the cable and a completely wound-up state of the cable.

Within the context of the invention, the term supporting structure should be broadly interpreted. The supporting structure can be, for example, a supporting component of a crab of a crane, a basic frame of a screen-cleaning apparatus or of running gear. The supporting structure at any rate serves for supporting the cable drum and for absorbing the cable forces acting on the cable drum. The cable drum can be supported on the supporting structure or connected to the supporting structure in some other way. For example, it is also conceivable and possible for the cable drum to hang on the supporting structure.

The cable drum is advantageously mounted rotatably on a bearing frame. The bearing frame could also be referred to as a supporting frame or drum frame. It is advantageously provided that, apart from the rotation of the rotatably mounted cable drum, no relative movement between the cable drum and the bearing frame is possible. That is to say that the bearing frame can advantageously be displaced together with the cable drum relative to the supporting structure. In order to reduce the friction between the bearing frame mounting and supporting the cable drum and the supporting structure during the displacement of the cable drum or of the bearing frame relative to the supporting structure, the cable winch arrangement can have a sliding guide or a roller guide.

It is preferably provided that the spindle, at least in an end position, extends at least in sections into a cavity of the cable drum. A particularly compact design of the cable winch arrangement can thereby be realized. The cable winch arrangement advantageously has two end positions, wherein the end positions limit the movement path of the cable drum in relation to the supporting structure in mutually opposite directions oriented parallel to the spindle axis or to the drum axis.

The cavity of the cable drum could be completely limited in the radial direction with respect to the drum axis by a drum casing of the cable drum. Furthermore, the cable drum could have two mutually opposite drum flanges which limit the cavity in the axial direction with respect to the drum axis.

It is particularly preferably provided that, in one of the end positions, the spindle of the spindle drive is arranged over at least 50%, preferably at least 70%, of the length of the spindle in the cavity of the cable drum.

In a preferred embodiment, the spindle has an external thread with a thread pitch, wherein the thread pitch of the external thread corresponds at least to the cable diameter of the at least one cable. The thread pitch refers to the distance between two thread leads with respect to a direction parallel to the spindle axis. The thread pitch specifies the extent of the adjustment of a spindle nut of the spindle drive with respect to a direction parallel to the spindle axis during a relative rotation of the spindle nut in relation to the spindle by 360°, i.e. by one revolution. Within the context of the invention, the outer diameter of the cable is meant by the cable diameter. A cable frequently has a cross section differing from circular in a cross section as seen orthogonally with respect to the longitudinal center axis of the cable. The diameter of a smallest area engaging around the cross section of the cable could also be referred to as the cable diameter.

It is preferably provided that the cable drum has a drum casing with at least one spiral groove for receiving at least one of the cables, wherein a thread pitch of the spiral groove corresponds to the thread pitch of the external thread of the spindle. The at least one spiral groove of the drum casing extends are advantageously helically along the, in particular around the, drum axis. The at least one groove of the drum casing could also be referred to as being the shape of a helix or as being helicoidal. The at least one groove can extend helically over the entire longitudinal extent of the drum casing. However, it is also conceivable and possible for the drum casing to have a plurality of grooves which can be arranged one behind another and spaced apart from one another with respect to the direction of the drum axis. In other embodiments, it is conceivable and possible for the spiral grooves to be nested in one another, i.e. for the thread pitch of a respective spiral groove to be larger than the cable diameter of the at least one cable. For example, the thread pitch could be an integral multiple of the cable diameter. For example, it is possible for four congruent spiral grooves which each have a thread pitch which corresponds to quadruple the cable diameter to be offset in each case by a quarter revolution with respect to a circumferential direction of the drum axis of the cable drum. However, this is only one specific exemplary embodiment and can be transferred to any number of cables. The entirety of the grooves of the drum casing could also be referred to as a multi-start grooving. In one possible other embodiment, an outer surface of the drum casing could be designed in the form of a circular-cylindrical casing, i.e. substantially smooth. That is to say that a grooved drum casing is then dispensed with.

In one possible embodiment according to the invention, it could be provided that the spindle is secured on the supporting structure for rotation therewith and non-displaceably, at least in the axial direction with respect to the spindle axis. It is then particularly preferably provided that the spindle is fixed to the supporting structure, i.e. that all degrees of freedom of the spindle with respect to the supporting structure are blocked.

It could be provided that the spindle drive has a transmission gearing for transmitting a rotational movement of the cable drum to a spindle nut, engaging in the spindle, of the spindle drive. It is thereby possible to use a spindle with an external thread which has a thread pitch which is smaller than the value of the cable diameter of the at least one cable.

In one possible variant embodiment, it is conceivable and possible for the or a spindle nut, engaging in the spindle, of the spindle drive to be fastenable or fastened to the cable drum for rotation therewith. In this embodiment, it is therefore provided that the rotational movement of the cable drum is transmitted directly to the spindle nut.

It could also be provided that the spindle nut, engaging in the spindle, is fastenable or fastened to the bearing frame of the cable drum for rotation therewith.

In another possible embodiments according to the invention, it can be provided that the spindle drive has a spindle drive mechanism for rotating the spindle relative to the supporting structure. The displacement of the cable drum can take place here as a whole by means of the spindle drive, in particular if the spindle nut is fastened to the supporting frame. However, in other embodiments, it would also be conceivable for the cable drum rotational movement to be combined with the rotation of the spindle of the spindle drive during operation. Overall, however, it is always provided within the context of the invention that the cable run-off point of the at least one cable is at least substantially positionally fixed with respect to the supporting structure.

The present invention also relates to a crane, in particular a gantry crane, for transporting at least one container or another load, wherein the crane has at least one crab which is mounted movably on a crane girder of the crane, and a load-pickup device for connection to the container or to the other load, wherein the load-pickup device hangs on the crab so as to be raisable and lowerable by cables of the crab, wherein the crab has at least one cable winch arrangement according to the invention for winding up and/or unwinding the cables of the crab.

It could be provided that a dedicated cable winch arrangement is provided for each cable of the crab. It is particularly preferred if a plurality of cables, for example four cables, can be wound up on a common cable drum. As already explained in conjunction with the possible embodiments of the cable winch arrangement, the grooves for receiving a respective cable could be arranged one behind another, i.e. spaced apart from one another, with respect to the direction of the drum axis. Variant embodiments of cable drums with multi-start grooves are also conceivable and possible.

The invention furthermore relates to a travel drive for displacing a transport unit which is movable along travel rails, wherein the travel drive comprises at least one cable winch arrangement according to the invention. The movable transport unit can be, for example, a crane. In another embodiment, the movable transport unit can be a crab which is mounted movably on a crane girder of a crane. In preferred embodiments, the cable winch arrangement is arranged on the transport unit. It is particularly advantageous if the drum axis of the cable drum is oriented parallel to a longitudinal extent of the travel rails.

The invention also relates to a screen-cleaning apparatus for cleaning a screen, in particular of a hydroelectric power station, wherein the screen-cleaning apparatus has a cleaning device, in particular a cleaning rake or a gripping tool, for picking up flotsam which has accumulated at the screen, and a drive arrangement for actuating the cleaning device, wherein the drive arrangement has at least one cable winch arrangement according to the invention. The cable winch arrangement makes it possible for a complicated cable pulley arrangement for deflecting the cables to be able to be dispensed with in drive arrangements of the cleaning device.

The drive arrangement of the screen-cleaning apparatus permits in particular the opening, closing or the pivoting of the cleaning device for picking up or releasing flotsam. Furthermore, it could alternatively or additionally be provided that the screen-cleaning apparatus is supported on travel rails and has a travel drive, which has a cable winch arrangement according to the invention, for moving the screen-cleaning apparatus along the travel rails.

BRIEF DESCRIPTION OF THE DRAWINGS

Further advantages and details of the invention will be explained below with reference to the exemplary embodiments according to the invention that are shown in the figures. In said figures:

FIGS. 12 to 14 show illustrations analogous to FIGS. 9 to 11 for the working position of the crane that is illustrated in FIG. 8;

FIGS. 15 to 18 show an alternative exemplary embodiment of a cable winch arrangement according to the invention in two end positions;

FIG. 22 shows a basic outline of the travel drive according to FIG. 20 in a second end position;

FIG. 23 shows an exemplary embodiment of a cleaning device for a screen-cleaning apparatus;

DETAILED DESCRIPTION

For clarity reasons, not all of the reference signs are entered in the figures.

Figure 1:
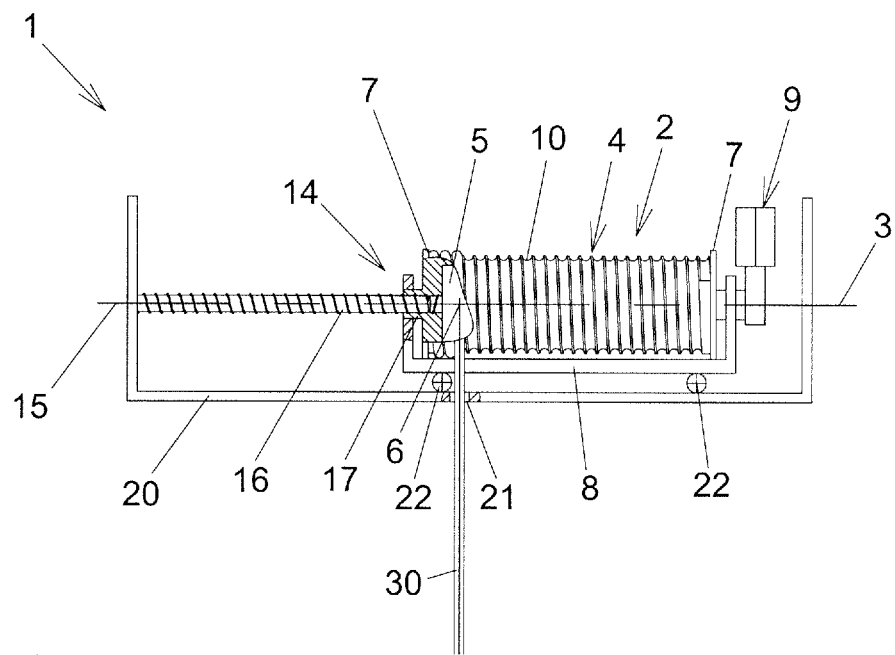
FIG. 1 shows a view of a first exemplary embodiment of a cable winch arrangement according to the invention in a first end position.
Figure 2:
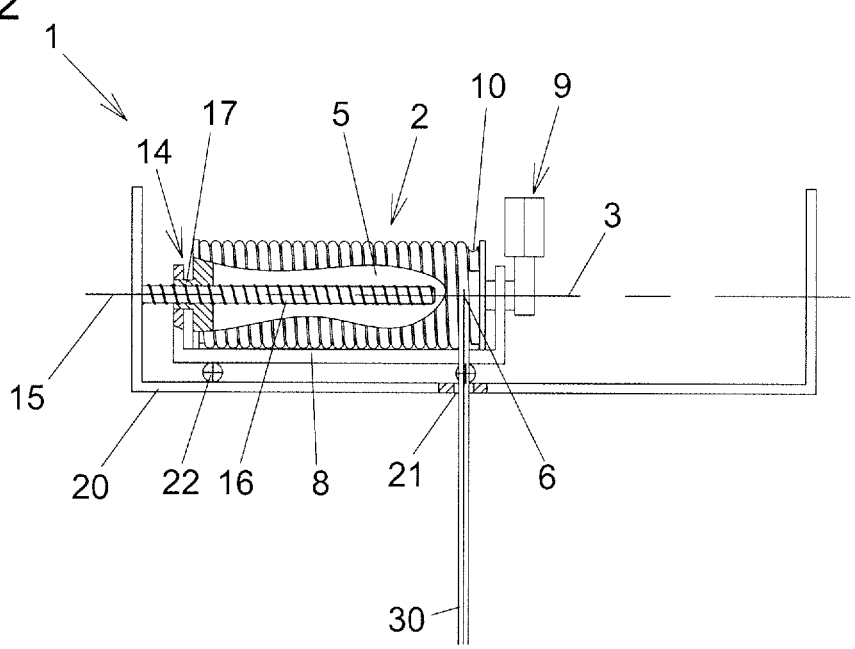
FIG. 2 shows the cable winch arrangement according to FIG. 1 in a second end position.

The cable winch arrangement 1 according to the invention that is illustrated in FIGS. 1 and 2 has a cable drum 2 for winding up and/or unwinding a cable 30, and a bearing frame 8 for the rotatable mounting of the cable drum 2, which is rotatable about a drum axis 3. The mounting, realized, for example, with rolling bearings, of the cable drum 2 on the bearing frame 8 is not illustrated separately in FIGS. 1 and 2. However, arrangements of this type are generally known in diverse embodiments.

The cable drum 2 has a drum casing 4 and two drum flanges 7 which adjoin the drum casing 4 on mutually opposite sides in the axial direction with respect to the drum axis 3. A cavity 5 is formed in the interior of the cable drum 2, said cavity being limited by the drum casing 4 in the radial direction with respect to the drum axis 3. The cavity 5 is limited by the drum flanges 7 in the axial direction with respect to the drum axis 3.

In the exemplary embodiment, the drum casing 4 has a spiral groove 10 for receiving the cable 30. The spiral groove 10 is of helicoidal design, i.e. is in the manner of a helix extending along the drum axis 3. The groove 10 could also be referred to as a grooving. The thread pitch of the spiral groove 10 corresponds in the exemplary embodiment to the cable diameter of the cable 30. In another variant embodiment, the thread pitch of the groove 10 could also have a thread pitch which is larger than the cable diameter of the cable 30, that is to say that the turns of that portion of the cable 30 which is wound up on the drum casing 4 are then spaced apart from one another. In other variant embodiments, the drum casing 4 of the cable drum 2 could also be designed without grooves. That is to say, the outer surface of the drum casing 4 could be designed, for example, in the shape of a circular-cylindrical casing, i.e. smooth.

The cable winch arrangement 1 furthermore has a drum drive 9 for rotating the cable drum 2 about the drum axis 3 relative to the bearing frame 8. As illustrated in the figures, the drum drive 9 can be a geared motor.

The bearing frame 8 is supported on a supporting structure 20 by means of support rollers 22 of the cable winch arrangement 1. The support rollers 22 facilitate the relative movement of the bearing frame 8 and therefore of the cable drum 2 in relation to the supporting structure 20. In another variant embodiment, sliding runners or the like could also be used instead of support rollers 22.

The supporting structure 20 is only illustrated schematically in FIGS. 1 and 2 in order to clarify the principle of the cable winch arrangement 1 according to the invention. Possible variant embodiments of the supporting structure 20 will be discussed in conjunction with the exemplary embodiments, which have yet to be explained, of the cable winch arrangement 1 according to the invention. In the exemplary embodiment illustrated in FIGS. 1 and 2, the supporting structure 20 has a cable passage 21, through which the cable 30 is threaded. However, a cable passage 21 is not compulsory.

The cable winch arrangement 1 has a spindle drive 14 for displacing the cable drum 2 relative to the supporting structure 20. The spindle drive 14 comprises a spindle 16 extending along a spindle axis 15, and a spindle nut 17 which engages in the spindle 16. The spindle drive 14 connects the supporting structure 20 to the cable drum 2. The spindle axis 15 of the spindle drive 14 is arranged coaxially with respect to the drum axis 3 of the cable drum 2.

In the first exemplary embodiment, the spindle 16 is secured on the supporting structure 20 for rotation therewith and so as to be non-displaceable in the axial direction with respect to the spindle axis 15. The spindle 16 is also fixed non-displaceably to the supporting structure 20 in all directions orthogonal with respect to the spindle axis 15.

In the first exemplary embodiment, it is provided that the spindle nut 17 is fastened to the cable drum 2 for rotation therewith. Rotation of the cable drum 2 by means of the drum drive 9 therefore leads to corresponding rotation of the spindle nut 17.

An adjustment of the spindle nut 17 relative to the spindle 16 along the spindle axis 15 leads to a corresponding adjustment of the cable drum 2 along the drum axis 3 relative to the supporting structure 20. In the exemplary embodiment, the cable winch arrangement 1 has two end positions which limit the displacement travel of the spindle nut 17 relative to the spindle 16. Overall, the cable drum 2 is therefore also displaceable relative to the supporting structure 20 between the first end position and the second end position of the cable winch arrangement 1.

In summary, it is therefore provided in the first exemplary embodiment that the bearing frame 8 together with the cable drum 2 and the spindle nut 17 and the drum drive 9 is displaceable along the drum axis 3 relative to the supporting structure 20.

In the exemplary embodiment, the spindle drive 14 is designed as a trapezoidal screw drive. That is to say, the spindle nut 17 has a trapezoidal internal thread and the spindle 16 has a trapezoidal external thread, which mesh in each other. Other variant embodiments of spindle drives are basically also conceivable and possible, as has already been mentioned at the beginning. For example, the spindle drive 14 could also be a flat screw drive.

In the first exemplary embodiment, it is provided that the thread pitch of the spiral groove 10 corresponds to a thread pitch of the external thread of the spindle 16. Rotation of the cable drum 2 by one revolution, i.e. by 360°, therefore leads to a relative displacement of the cable drum 2 in relation to the supporting structure 20, in a direction parallel to the drum axis 4, by the thread pitch of the external thread of the spindle 16. It can thereby be ensured that a cable run-off point 6 of the cable 30, at which the cable 30 runs tangentially onto and/or out from the cable drum 2, is at least substantially positionally fixed with respect to the supporting structure 20. Since, in the first exemplary embodiment, the thread pitch of the external thread of the spindle 16 corresponds to the thread pitch of the spiral groove 10 of the drum casing 4, it is therefore inevitably ensured that the cable run-off point 6 is always positionally fixed with respect to the supporting structure 20.

FIG. 1 illustrates the cable drum 2 in the first end position of the cable winch arrangement 1, in which the cable 30, apart from a remaining residual length which is wound up on the cable drum 2, is unwound from the cable drum 2.

FIG. 2 illustrates the second end position in which the cable 30 is wound up maximally onto the cable drum 2. In an overall view of FIGS. 1 and 2, it is directly apparent that the cable run-off point 6 is positionally fixed, i.e. immovable, with respect to the supporting structure 20. It is thereby ensured that the cable 30 can run through the cable passage 21 irrespective of the length of that portion of the cable 30 which is wound up onto the cable drum 2.

In the exemplary embodiment shown, it is provided that the spindle 16, in particular a portion of the spindle 16 that has the external thread, extends in the second end position, cf. FIG. 2, over at least 70% of the longitudinal extent of the spindle 16, in particular of the longitudinal extent of the external thread of the spindle 16, into the cavity 5 of the cable drum 2.

Figure 3:
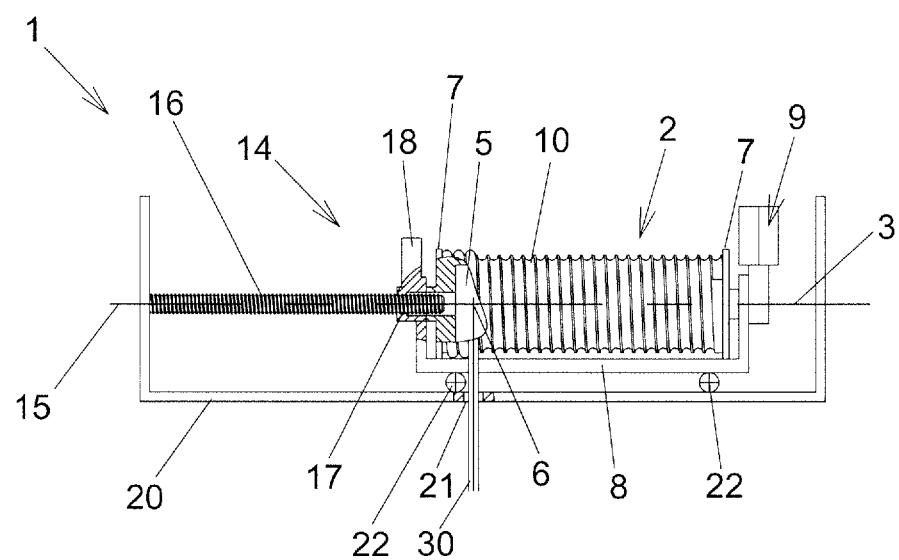
FIGS. 3 and 4 show a second exemplary embodiment of a cable winch arrangement in illustrations analogous to FIGS. 1 and 2.
Figure 4:
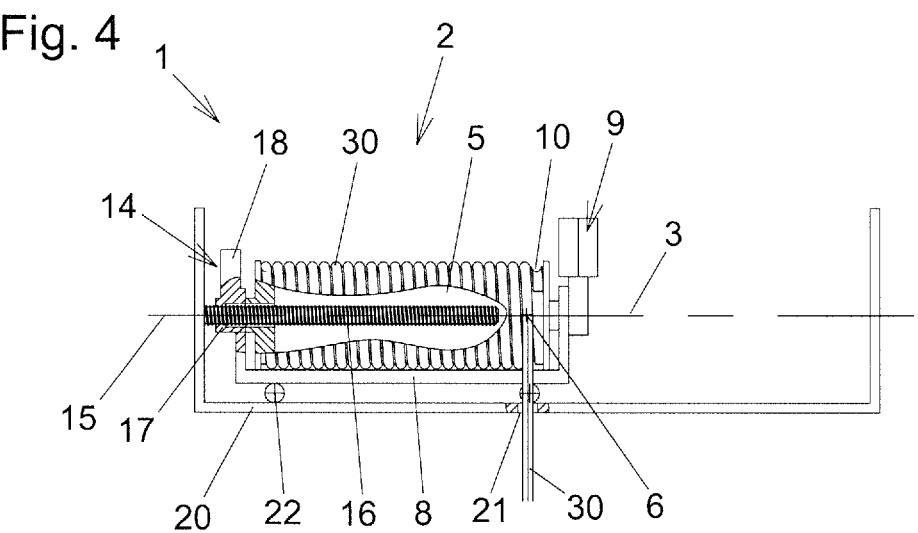

FIGS. 3 and 4 illustrate a second exemplary embodiment of a cable winch arrangement 1 according to the invention. The design of the cable drum 2, the drum drive 9 and the supporting structure 20 corresponds to that of the first exemplary embodiment, and therefore reference is primarily made to the differences over the first exemplary embodiment in the explanations with regard to the second exemplary embodiment. Apart from the differences cited below, the explanations with regard to the first exemplary embodiment also apply in the case of the second exemplary embodiment.

In the second exemplary embodiment, it is provided that the external thread of the spindle 16 has a thread pitch which is smaller than the cable diameter of the cable 30. Accordingly, the thread pitch of the external thread of the spindle 16 is smaller than the thread pitch of the spiral groove 10 of the drum casing 4 of the cable drum 2. In order to ensure that the cable run-off point 6 of the cable 30, at which the cable 30 runs tangentially out from the cable drum 2 and/or onto the cable drum 2, is at least substantially positionally fixed with respect to the supporting structure 20, the spindle drive 14 has a transmission gearing 18. The transmission gearing 18 transmits the rotational movement of the cable drum 2 to the spindle nut 17, engaging in the spindle 16, of the spindle drive 14. That is to say that, in the second exemplary embodiment, the rotational speed of the spindle nut 17 is different from the rotational speed of the cable drum 2. The transmission gearing 18 is configured here such that, during a rotation of the cable drum 2 by one revolution, a feed rate of the spindle nut 17 on the spindle 16 corresponds to the thread pitch of the groove 10 of the cable drum 2 or to the cable diameter of the cable 30.

In the exemplary embodiment, it is provided that the transmission gearing 18 is fastened to the bearing frame 8 for rotation therewith and transmits the rotational movement of the cable drum 2 to the spindle nut 17, with the corresponding rotational speed transmission ratio.

Figure 5:
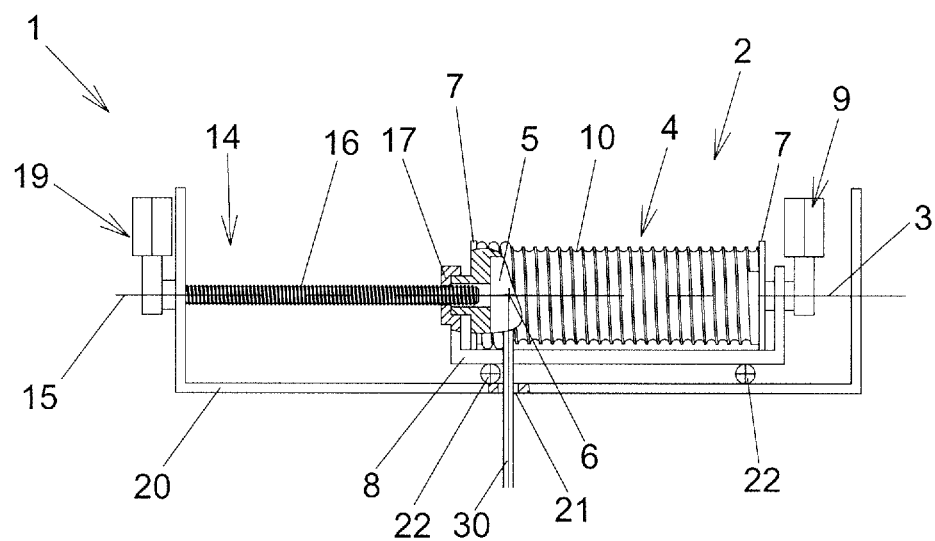
FIGS. 5 and 6 show a third exemplary embodiment of a cable winch arrangement in views analogous to FIGS. 1 and 2.
Figure 6:
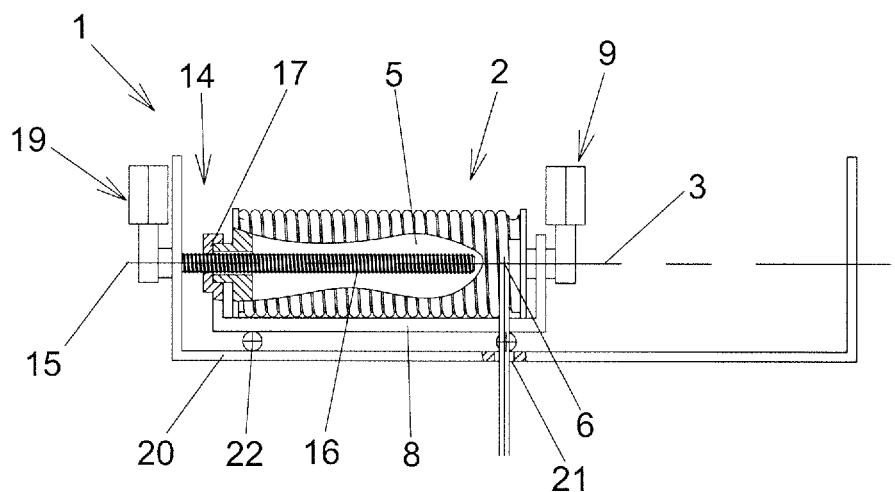

FIGS. 5 and 6 illustrate a third exemplary embodiment of a cable winch arrangement 1 according to the invention. The design of the cable drum 2, the drum drive 9 and the supporting structure 20 corresponds to that of the first exemplary embodiment, and therefore reference is primarily made to the difference over the first exemplary embodiment in the explanations with regard to the third exemplary embodiment. Apart from the differences cited below, the explanations with regard to the first exemplary embodiment also apply in the case of the third exemplary embodiment.

In the third exemplary embodiment, similarly to the second exemplary embodiment, it is provided that the external thread of the spindle 16 has a smaller thread pitch than the cable diameter of the cable 30. Accordingly, the thread pitch of the external thread of the spindle 16 is also smaller than the thread pitch of the spiral groove 10 of the drum casing 4 of the cable drum 2. However, this is not compulsory; it could also be provided, in an alternative variant embodiment, that the thread pitch of the external thread of the spindle 16 corresponds at least to the cable diameter of the cable 30 and/or at least to the thread pitch of the spiral groove 10.

In the third exemplary embodiment, the spindle drive 14 has a spindle drive mechanism 19 for rotating the spindle 16 about the spindle axis 15 relative to the supporting structure 20. The spindle nut 17 is fastened to the bearing frame 8 for rotation therewith. Rotation of the spindle 16 by means of the spindle drive mechanism 19 brings about a relative movement of the cable drum 2 in relation to the supporting structure 20. The spindle drive mechanism 19 is activated by means of an electronic control unit (not illustrated specifically) in such a manner that the cable run-off point 6 of the cable 30, at which the cable 30 runs tangentially onto and/or out from the cable drum 2, is at least substantially positionally fixed with respect to the supporting structure 20. In other words, the spindle drive mechanism 19 is activated by means of the electronic control unit in such a manner that the rotational movement of the cable drum 2 and the adjustment of the cable drum 2 about the drum axis 3 by means of the drum drive 9 are coordinated with each other in a direction parallel to the drum axis 3, i.e. are synchronous, wherein the cable run-off point 6 is at least substantially positionally fixed with respect to the supporting structure 20. For this purpose, the electronic control unit could, for example, simultaneously activate the drum drive 9 and the spindle drive mechanism 19 in order to bring about a synchronous activation of the cable drum 2 and of the spindle 16.

In an alternative variant embodiment, it would be conceivable for the spindle nut 17 to be fixed on the cable drum 2 for rotation therewith. The rotational movement of the cable drum 2 is then advantageously combined with that of the driven spindle 16. Using the electronic control unit, it can also be ensured here that the cable run-off point 6 is at least substantially positionally fixed with respect to the supporting structure 20.

Exemplary applications of a cable winch arrangement 1 according to the invention will now be discussed below. Each of the three variant embodiments illustrated in FIGS. 1 to 6 can basically be used in the applications explained below. For the sake of simplicity, the exemplary embodiments described below relate to special variant embodiments of the above-explained first embodiment of the cable winch arrangement 1. The modifications which are explained below and relate, for example, to the number of the cables which can be wound up on a cable drum are equally transferrable to the mentioned further embodiments of cable winch arrangements according to the invention.

FIGS. 7 to 14 show a crane 40, which is designed as a gantry crane, for transporting containers 41 in a container terminal. The crane 40 is displaceable horizontally with respect to a direction orthogonal with respect to the plane of the drawing, wherein the crane 40 is supported on crane rails 49 with running gear 45 of the crane 40, cf. FIG. 7. In another embodiment of the crane 40, the running gear 45 could also be provided with pneumatic tires and could move directly on the underlying surface. The crane 40 furthermore has a crane girder 42 which spans the region between the crane rails 49, i.e. a depositing area for containers 41. The crane girder 42 is supported on the running gear 45 via uprights 46 of the crane 40. A crab 43 is mounted movably on the crane girder 42, which may also be referred to as the main girder. The crab 43 is supported by means of running rollers (not denoted specifically) on crab travel rails 47 fastened to the crane girder 42. Furthermore, the crane 40 comprises a load-pickup device 44 for connection to at least one container 41. The load-pickup device 44 hangs with cables 30 to 37 of the crab 43 on the crab 43 and can be moved relative to the crab 43 by extension or shortening of the free length of the cables 30 to 37 in the vertical direction. This is all known per se in the prior art.

The cables 30 to 37 extending between the crab 43 and the load-pickup device 44 together form a cable shaft, also called cable tower. It is apparent from an overall view of FIGS. 7 and 8 that the geometry of the cable shaft which is spanned by the cables 30 to 37 varies depending on the vertical position of the load-pickup device 44. In particular, the free length of the cables 30 to 37 and the relative angle between individual cables 30 to 37 with respect to each other changes, cf. also FIGS. 9 and 12.

In the exemplary embodiment illustrated, the crab 43 has two cable winch arrangements 1 for winding up and/or unwinding the cables 30 to 37 of the crab 43. In the exemplary embodiment, the cables 30 to 33 can be wound up on a first cable drum 2 and the cables 34 to 37 on a second cable drum 2. The entirety of the cables 30 to 33 could also be referred to as the first cable group and the entirety of the cables 34 to 37 as the second cable group. As a result, the cables 30 to 33, i.e. the first cable group, and the cables 34 to 37, i.e. the second cable group, are each wound up synchronously onto the respective cable drum 2 or can be unwound from the respective cable drum 2.

The respective cable winch arrangement 1 comprises a cable drum 2, which is mounted rotatably about a drum axis 3, for winding up and unwinding the respective cable group, wherein the cable winch arrangement 1 is designed analogously to the first exemplary embodiment according to FIGS. 1 and 2. That is to say, the cable winch arrangement 1 has a spindle drive 14 for displacing the cable drum 2 relative to the supporting structure 20 of the crab 43. The spindle drive 14 comprises a spindle 16 extending along a spindle axis 15, and a spindle nut 14 which engages in the spindle 16. The spindle drive 14 connects the supporting structure 20 to the cable drum 2. As merely illustrated in FIG. 11, the spindle axis 15 is arranged coaxially with respect to the drum axis 3 of the cable drum 2. Analogously to the exemplary embodiment illustrated in FIGS. 1 and 2, the spindle 16 is fixed to the supporting structure 20 for rotation therewith. The thread pitch of the external thread of the spindle 16 corresponds to the thread pitch of the spiral grooves 10 to 13, wherein the latter are shown in FIG. 14 for one of the cable drums 2. The spindle drive 14 permits an adjustment of the cable drum 2 relative to the supporting structure 20 of the crab 43. The bearing frame 8 of the cable winch arrangement 1 is supported on the supporting structure 20 of the crab 43 by means of support rollers 22. Otherwise, reference is made in respect of the design of the cable winch arrangement 1 to the explanations regarding the first exemplary embodiment illustrated in FIGS. 1 and 2.

In the exemplary embodiment shown of the crane 40, the drum casing 4 of the respective cable drum 2 has four cable groove portions which are spaced apart from one another with respect to a direction parallel to the drum axis 3 and each have a groove 10, 11, 12 and 13, cf. FIG. 14, in which the grooves 10-13 for one of the cable drums 2 are shown. That is to say, the cables 30 to 33 or 34 to 37 of a respective cable group run out from the cable drum 2 or onto the cable drum 2 in a manner spaced apart from one another with respect to the longitudinal extent of the respective cable drum 2.

The crab 43 has cable pulleys 48 for deflecting a respective cable 30 to 37. The cable pulleys 48 have an encircling cable groove in which the respective cable 30 to 37 is guided. The cable pulleys 48 have the purpose of deflecting the respective cable 30 to 37 at an anchoring point of a respective cable 30 to 37 on the load-pickup device 44.

Analogously to the first exemplary embodiment of the cable winch arrangement 1 that is illustrated in FIGS. 1 and 2, it is provided that a respective cable run-off point of the respective cable 30 to 37 wound up on the cable drum 2, at which the respective cable 30 to 37 runs tangentially onto and/or out from the cable drum 2, is at least substantially positionally fixed with respect to the supporting structure 20. That is to say, rotation of the cable drum 2 leads to a corresponding displacement of the cable drum 2 relative to the supporting structure 20, wherein the respective cable run-off point is substantially positionally fixed with respect to the supporting structure 20. For clarity reasons, the respective cable run-off point has not been shown in FIGS. 7 to 14.

Between the respective cable run-off point and the respective cable pulley 48, the respective cable 30 to 37 advantageously runs in a tangential direction with respect to the drum axis 3. Since the cable run-off points are immovable, the number of cable pulleys 48 of the crab 43 can be minimized since the striking angle of the respective cable 30 to 37 from the cable drum 2 to the respective cable pulley 48 remains constant. The respective cable pulleys 48 are advantageously oriented and positioned in such a manner that the respective cable 30 to 37 which is to be deflected runs into the cable groove of the respective cable pulley 48 from the respective cable run-off point rectilinearly, i.e. without deviating from a cable groove plane of the respective cable pulley 48.

FIGS. 15 to 18 show an alternative exemplary embodiment of a cable winch arrangement 1 for a crane. It is provided here that the drum axis 3, and therefore also the spindle axis 15 of the spindle drive 14, are oriented vertically. In the exemplary embodiment shown, the cables 30 to 33 run downwards in the vertical direction. By way of example, the cable run-off point 6 has been drawn in for the cable 32. The cable run-off point 6 is positionally fixed with respect to the supporting structure 20, which is merely indicated schematically in FIGS. 15 and 17. To the same extent at which the spindle nut 17 is displaced along the spindle 16, the cable drum 2 is also displaced relative to the supporting structure 20. FIGS. 15 and 17 in each case illustrate one of the two end positions of the cable winch arrangement 1, wherein a distance 23 between the drawn-in cable run-off point 6 of the cable 32 and a reference plane of the supporting structure 20 is constant in the end positions and also during the displacement of the cable drum 2 from one end position into the other end position. Furthermore, the position of the cable pulleys 48 with respect to the supporting structure 20 is also positionally fixed.

FIGS. 16 and 18 are identical and show that that portion of the respective cable 30 to 33 that runs out from the cable drum 2 is tangential with respect to the drum axis 3.

FIGS. 19 to 22 show a further application of a cable winch arrangement 1 according to the invention in a screen-cleaning apparatus 60. The screen-cleaning apparatus 60 serves for cleaning a screen 65 of a hydroelectric power station (not illustrated specifically), for example in the region of a dam of a hydroelectric power station. The screen 65 is merely indicated and, as is known, has a multiplicity of through openings for water. Flotsam which is deposited from the water flowing through the through openings collects at the screen 65. In order to pick up flotsam which has accumulated at the screen 65, the screen-cleaning apparatus 60 has a cleaning device 61 which can have a cleaning rake or a gripping tool. The screen-cleaning apparatus 60 is supported on travel rails 51 by means of running gear 52.

The screen-cleaning apparatus 60 has a travel drive 50 for displacing a movable transport unit 54 of the screen-cleaning apparatus 60. The transport unit 54 could also be referred to as a chassis of the screen-cleaning apparatus 60, cf. FIG. 20. In the exemplary embodiment, it is provided that the travel drive 50 has a cable winch arrangement 1 according to the invention, which is arranged on the transport unit 54. Two cables 30, 31 can be wound up onto the cable drum 2 of the cable winch arrangement 1 or re-wound up, wherein one end of a respective cable 30, 31 is anchored on the cable drum 2. Those ends of the cables 30, 31 which are remote from the cable drum 2 are anchored at mutually opposite anchoring points (not illustrated) of the hydroelectric power station.

In the exemplary embodiment, the travel drive 50 of the transport unit 54 has two cable pulleys 48 for deflecting the cables 30, 31 running out from the cable drum 2 in mutually opposite directions parallel to the longitudinal extent of the travel rails 51. The cable pulleys 48 are positionally fixed with respect to the supporting structure 20.

Rotation of the cable drum 2 by means of the drum drive 9 leads simultaneously to the winding up of one of the cables 30, 31 and to the unwinding of the other of the two cables 30, 31. The transport unit 54 is thereby displaced along the travel rails 51.

Figure 7:
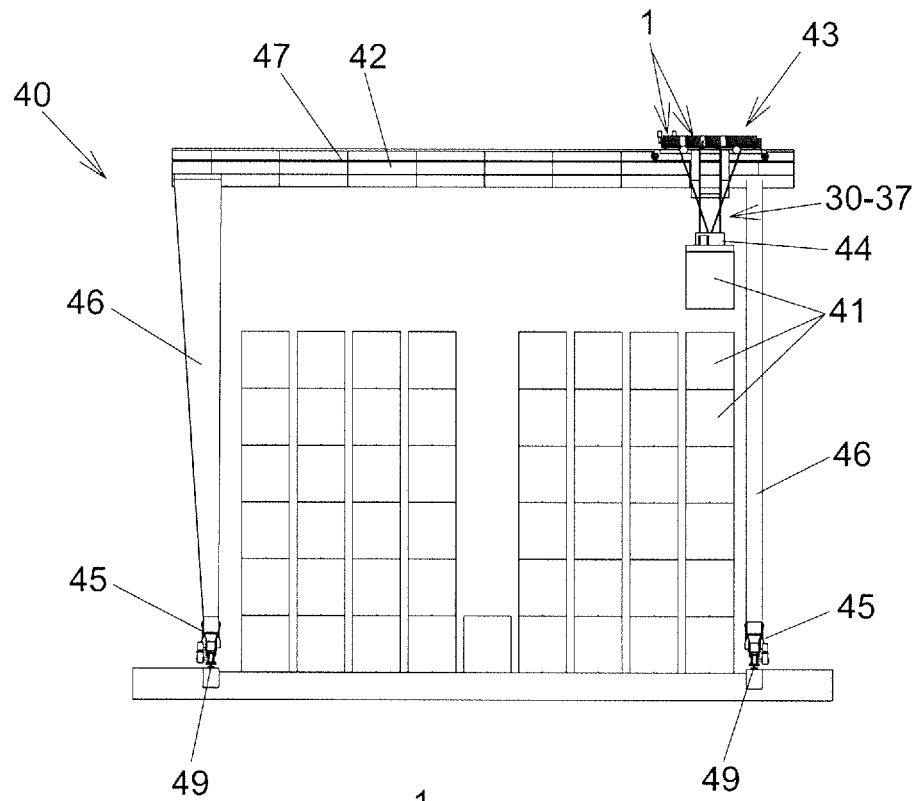
FIGS. 7 and 8 show a crane according to the invention in two different working positions.
Figure 8:
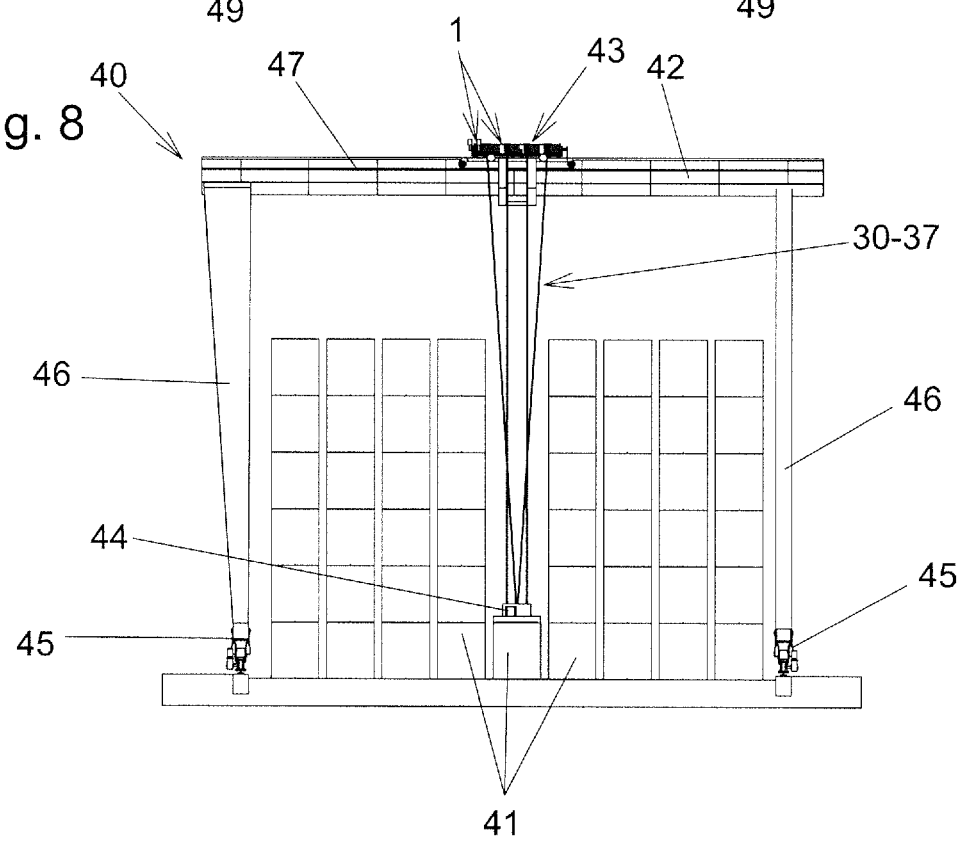
Figure 9:
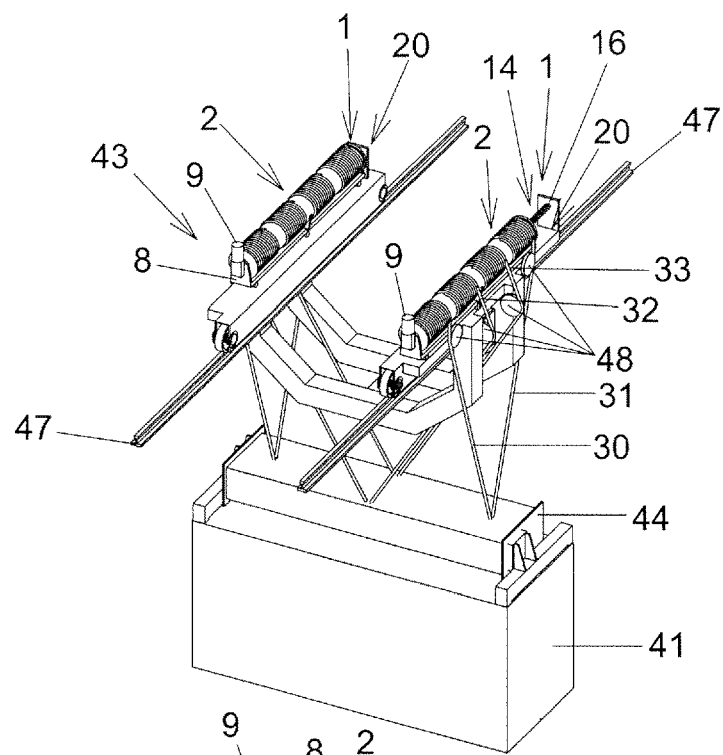
FIG. 9 shows an isometric view of a crab, which is displaceable along crab rails, of the crane according to FIG. 7 in the working position shown in FIG. 7.
Figure 10:
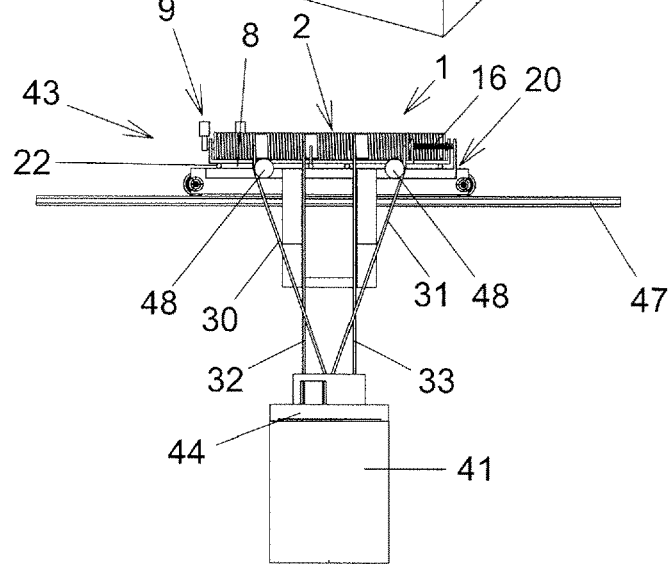
FIG. 10 shows a view orthogonally to a longitudinal extent of the crab rails according to FIG. 9.
Figure 11:
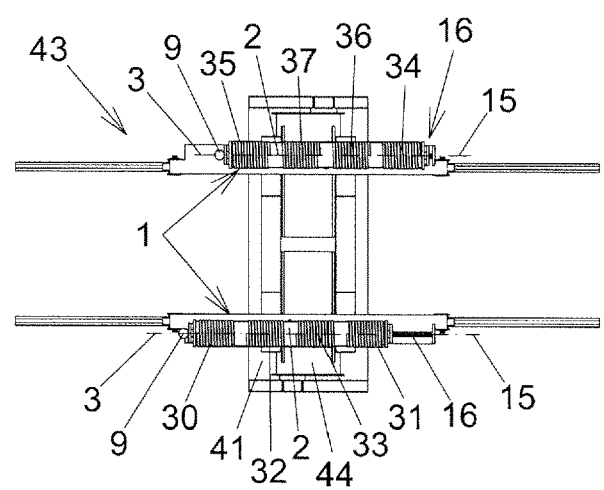
FIG. 11 shows a basic outline of the crab according to FIG. 9.
Figure 19:
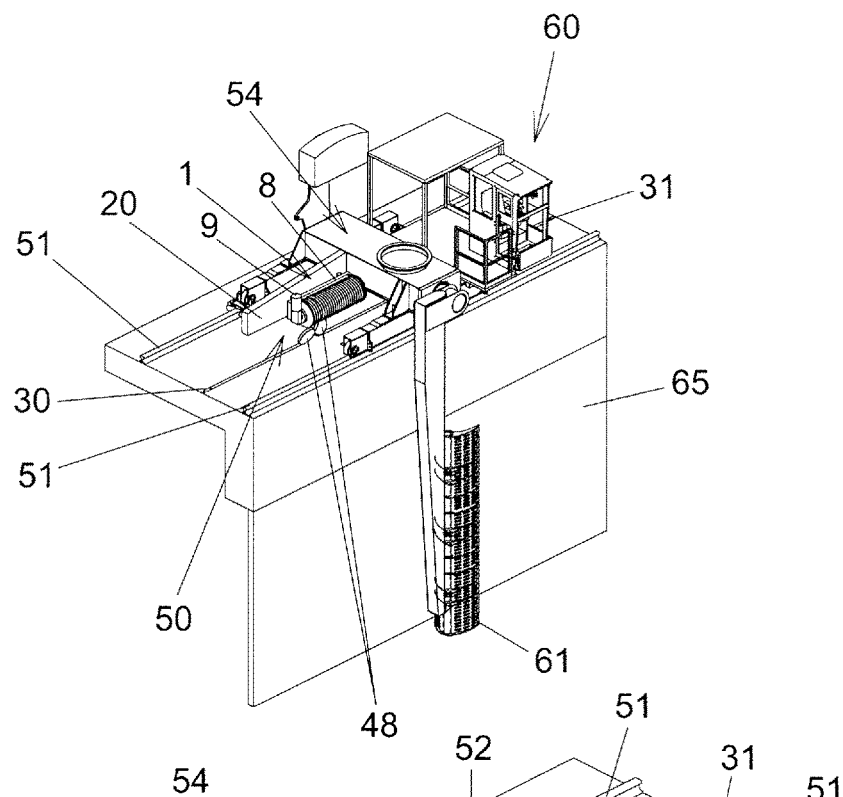
FIG. 19 shows an isometric view of a screen-cleaning apparatus according to the invention with a travel drive.
Figure 20:
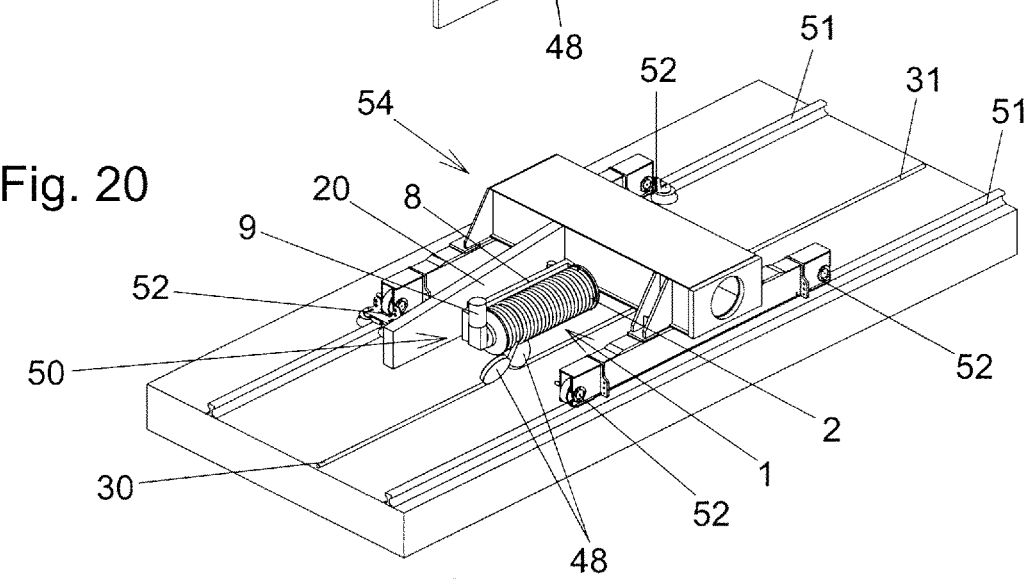
FIG. 20 shows the travel drive of the screen-cleaning apparatus according to FIG. 19 in detail.
Figure 21:
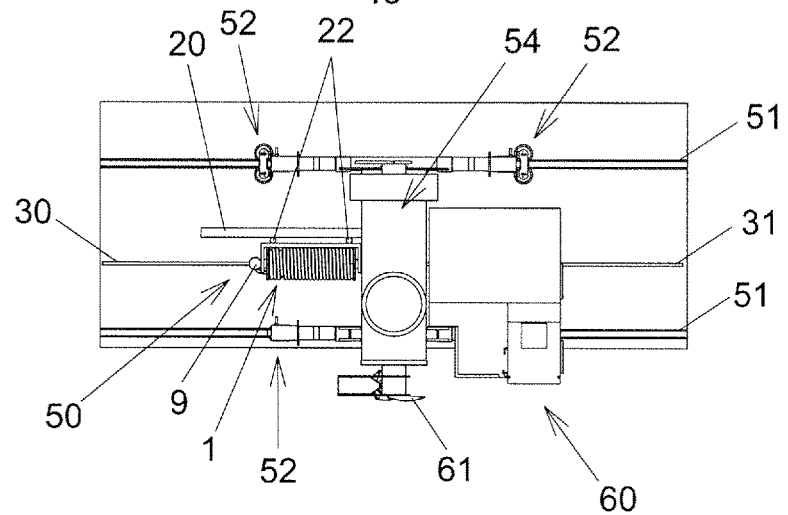
FIG. 21 shows a basic outline of the travel drive according to FIG. 20 in a first end position.

In a departure from the transport unit 54, illustrated in FIGS. 19 to 22, of a screen-cleaning apparatus 60, the transport unit 54 could also be a crab, for example of a crane, as illustrated in FIGS. 7 and 8. With the travel drive 50, it would then be possible to change the positioning of the crab along the crane girder of the crane. In another variant embodiment of the invention, the crane 40 itself could also be displaceable by means of such a travel drive along crane rails or, in the event of having tires, along the underlying surface, wherein at least one of the running gears of the crane then has a travel drive with a cable winch arrangement.

FIGS. 23 to 26 show yet another application of a cable winch arrangement 1 according to the invention in a screen-cleaning apparatus 60. The screen-cleaning apparatus 60 has a cleaning device 61 designed as a gripping tool, and a drive arrangement 62 for actuating the cleaning device 61. The drive arrangement 62 comprises the cable winch arrangement 1.

The cleaning device 61 is displaceable along the screen 65 in the vertical direction, cf. the directions of movement 71 of the cleaning device 61 that are drawn in as a double arrow in FIG. 23. The cleaning device 61 has a multiplicity of gripping arms 68 and a comb 69, wherein the gripping arms 68 are pivotable about a pivot axis 72 in relation to the comb 69. Due to the side view, only one of the gripping arms 68 is illustrated in FIG. 23. All of the gripping arms 68 are advantageously connected to one another for rotation therewith, i.e. the gripping arms 68 are pivotable together about the pivot axis 72. FIG. 23 illustrates an open state of the cleaning device 61 for picking up or releasing flotsam, by solid lines, and a closed position of the cleaning device 61 for gripping and holding the flotsam, by dashed lines. Cleaning devices 61 of this type are known per se and by themselves.

Figure 24:
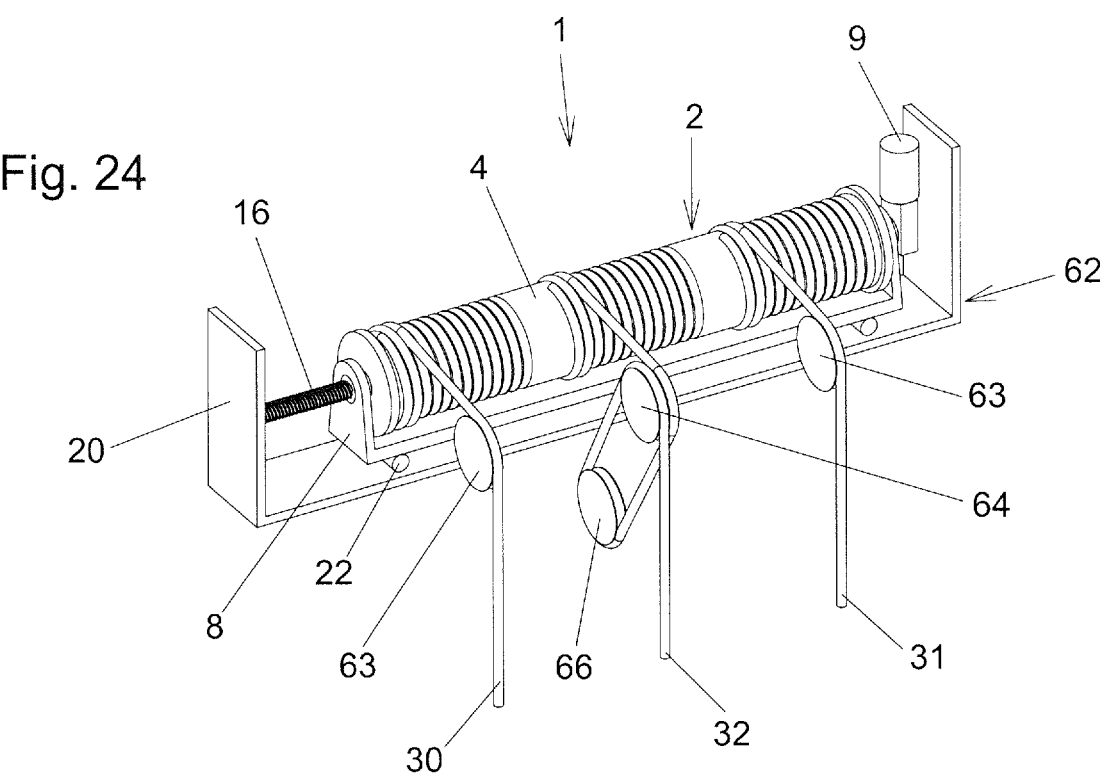
FIG. 24 shows an isometric view of the cable winch arrangement of the cleaning device according to FIG. 23.
Figure 25:
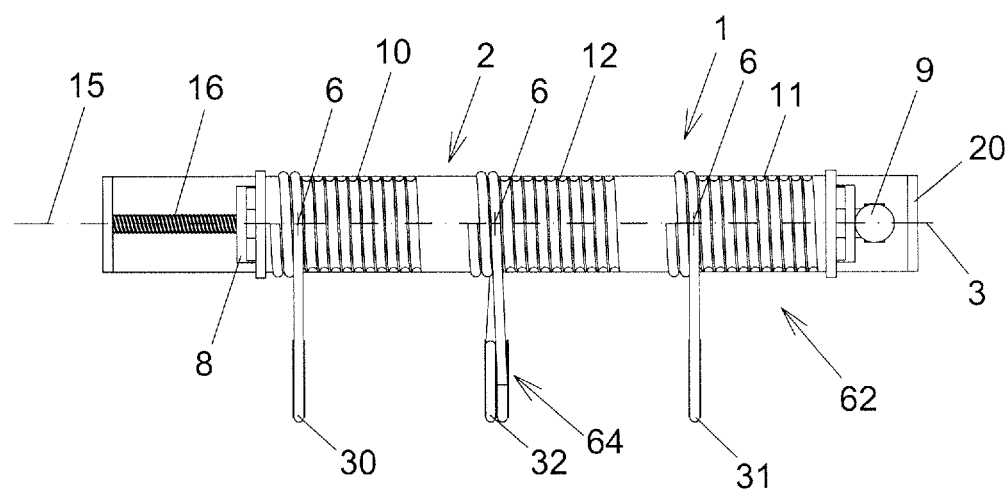
FIG. 25 shows a basic outline of the cable winch arrangement according to FIG. 24 in a first end position.
Figure 26:
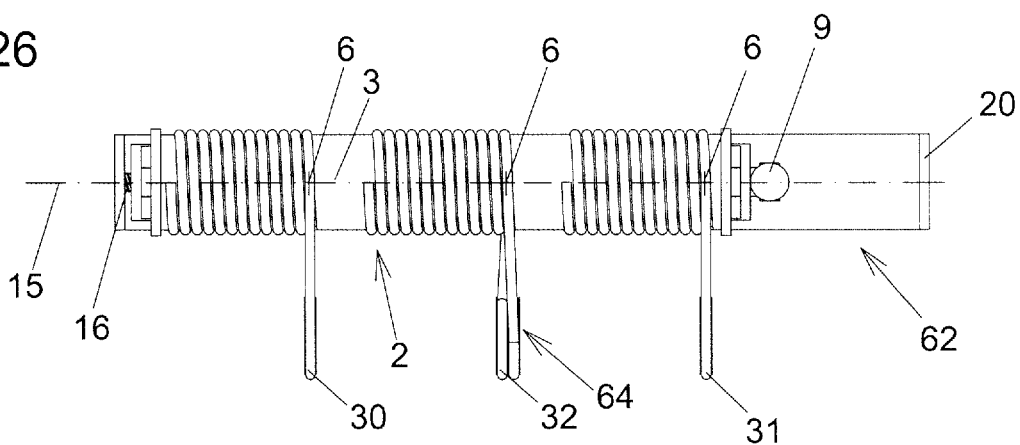
FIG. 26 shows a basic outline of the cable winch arrangement according to FIG. 24 in a second end position.

The drive arrangement 62 comprises one of the cable winch arrangements 1 (already explained) for winding up and/or unwinding three cables 30-32, cf. FIG. 24. Furthermore, the drive arrangement 62 comprises two cable pulleys 63 for deflecting the cables 30, 31, and a double cable pulley 64 for deflecting the cable 32, and a cable pulley 66 which is displaceable relative to the double cable pulley 64. The cable pulleys 63 and the double cable pulley 64 are positionally fixed with respect to the supporting structure 20. The displaceable cable pulley 66 is positionally fixed with respect to the supporting structure 20 with respect to a direction parallel to the drum axis 3. In the exemplary embodiment, the displaceable cable pulley 66 is displaceable relative to the double cable pulley 64 in a plane oriented orthogonally with respect to the drum axis 3, as is illustrated schematically in FIG. 23. The two end positions of the displaceable cable pulley 66, which is displaceable along a displacement path 67, are drawn in in solid or dashed lines.

The respective free end of the cables 30, 31 is anchored to the cleaning device 61. The cable 32 runs from the cable drum 2 into a first cable groove of the double cable pulley 64 and runs out of the first cable groove in the direction towards the cable pulley 66. The cable pulley 66 deflects the cable 32 into a second cable groove of the double cable pulley 64. From the second cable groove of the double cable pulley 64, the cable 32 is guided to the screen-cleaning apparatus 61. A deflecting cable pulley 70 which deflects the cable 32 to an anchoring point on the gripping arms 68 is arranged on the screen-cleaning device 61, cf. FIGS. 23 and 24.

The rotation of the cable drum 2 of the cable winch arrangement 1 leads to a synchronous running off of the cables 30, 31 and 32. That is to say, the cleaning device 61 can be adjusted in the vertical direction in a simple manner without skewing of the cleaning device 61 occurring. Within the context of the invention, the cable run-off points 6, shown in FIGS. 25 and 26, of the cables 30 to 32 are substantially positionally fixed with respect to the supporting structure 20. Reference is in turn made to the explanations in respect of FIGS. 1 and 2 in respect of the design of the cable winch arrangement 1.

By displacement of the displaceable cable pulley 66 along the displacement path 67 relative to the double cable pulley 64, the free end of the cable 32 can be moved relative to the free ends of the cables 30, 31. Since the cable 32 is anchored to the gripping arms 68, the relative movement of the displaceable cable pulley 66 with respect to the double cable pulley 64 leads by corresponding extension or shortening of the free cable length of the cable 32 anchored to the gripping arms 68 to pivoting of the gripping arms 68 between the abovementioned states, i.e. the open state and the closed state of the cleaning device 61, cf. FIG. 23.

As already explained, in the exemplary embodiment illustrated in FIGS. 22 to 26, the cleaning device 61 is displaceable along the screen 65 in the vertical direction. In another variant embodiment, the screen 65 could be inclined by 45° to 85°, preferably by 60° to 80°, with respect to a horizontal. The movement directions 71 of the cleaning device 61 are then advantageously oriented parallel to the orientation of the inclined screen 65.

In a further variant embodiment, the screen-cleaning apparatus 60 illustrated in FIGS. 23-26 could additionally also have a travel drive 50 with which the screen-cleaning apparatus 60 is displaceable along travel rails 51, as is shown in the case of the screen-cleaning apparatus 60 according to FIGS. 19-22. That is to say, the screen-cleaning apparatus could then have two cable winch arrangements 1, wherein one of the cable winch arrangements 1 serves as a travel drive 50 and a second cable winch arrangement 1 as a drive arrangement 62 for actuating the cleaning device 61.

| Key to the Reference Numbers: | |
|---|---|
| 1 | Cable winch arrangement |
| 2 | Cable drum |
| 3 | Drum axis |
| 4 | Drum casing |
| 5 | Cavity |
| 6 | Cable run-off point |
| 7 | Drum flange |
| 8 | Bearing frame |
| 9 | Drum drive |
| 10 | Groove |
| 11 | Groove |
| 12 | Groove |
| 13 | Groove |
| 14 | Spindle drive |
| 15 | Spindle axis |
| 16 | Spindle |
| 17 | Spindle nut |
| 18 | Transmission gearing |
| 19 | Spindle drive mechanism |
| 20 | Supporting structure |
| 21 | Cable passage |
| 22 | Support roller |
| 23 | Distance |
| 30 | Cable |
| 31 | Cable |
| 32 | Cable |
| 33 | Cable |
| 34 | Cable |
| 35 | Cable |
| 36 | Cable |
| 37 | Cable |
| 40 | Crane |
| 41 | Container |
| 42 | Crane girder |
| 43 | Crab |
| 44 | Load-pickup device |
| 45 | Crane running gear |
| 46 | Upright |
| 47 | Crab travel rail |
| 48 | Cable pulley |
| 49 | Crane rail |
| 50 | Travel drive |
| 51 | Travel rail |
| 52 | Running gear |
| 54 | Transport unit |
| 60 | Screen-cleaning apparatus |
| 61 | Cleaning device |
| 62 | Drive arrangement |
| 63 | Cable pulley |
| 64 | Double cable pulley |
| 65 | Screen |
| 66 | Displaceable cable pulley |
| 67 | Displacement path |
| 68 | Gripping arm |
| 69 | Comb |
| 70 | Deflecting cable pulley |
| 71 | Directions of movement |
| 72 | Pivot axis |

The invention claimed is:

1. A screen-cleaning apparatus for cleaning a screen of a hydroelectric power station, the screen-cleaning apparatus comprising a cleaning device adapted to pick-up flotsam which has accumulated at the screen, and a drive arrangement for actuating the cleaning device, the drive arrangement comprises at least one cable winch arrangement including:

at least one cable drum mounted rotatably about a drum axis for at least one of winding up or unwinding at least one cable;

a supporting structure;
a spindle drive including a spindle that extends along a spindle axis, wherein the spindle drive axially displaces the cable drum relative to the supporting structure along the spindle axis;
a cable run-off point of the at least one cable, at which the cable runs tangentially at least one of onto or out from the cable drum, is positionally fixed with respect to the supporting structure; and
the spindle axis is arranged coaxially with respect to the drum axis of the cable drum.

2. The screen-cleaning apparatus according to claim 1, wherein the spindle, at least in an end position, extends at least partially into a cavity of the cable drum.

3. The screen-cleaning apparatus according to claim 1, wherein the spindle includes an external thread with a thread pitch, and the thread pitch corresponds at least to a cable diameter of the at least one cable.

4. The screen-cleaning apparatus according to claim 3, wherein the cable drum includes a drum casing with at least one spiral groove for receiving at least one of the cables, and a thread pitch of the spiral groove corresponds to the thread pitch of the external thread of the spindle.

5. The screen-cleaning apparatus according to claim 1, wherein the spindle is secured on the supporting structure for rotation therewith, and is non-displaceable, at least in an axial direction, with respect to the spindle axis.

6. The screen-cleaning apparatus according to claim 1, wherein the spindle drive includes a transmission gearing for transmitting a rotational movement of the cable drum to a spindle nut, engaged with the spindle.

7. The screen-cleaning apparatus according to claim 1, further comprising a spindle nut engaged with the spindle, and the spindle nut is fastened to the cable drum for rotation therewith.

8. The screen-cleaning apparatus according to claim 7, further comprising a bearing frame, the cable drum is mounted rotatably on the bearing frame, and the bearing frame is axially displaceable together with the cable drum relative to the supporting structure.

9. The screen-cleaning apparatus according to claim 1, wherein the spindle drive includes a spindle drive mechanism that rotates the spindle relative to the supporting structure (20).

10. The screen-cleaning apparatus of claim 1, wherein the at least one cable winch arrangement comprises first and second cable winch arrangements and the second cable winch arrangement forms part of a travel drive, wherein the screen-cleaning apparatus is adapted to be supported on travel rails and the travel drive is adapted to move the screen-cleaning apparatus along the travel rails.

11. The screen cleaning apparatus according to claim 1, wherein the cleaning device comprises a comb and gripping arms which are all pivotable together about a pivot axis in relation to the comb between a closed state and an open state of the cleaning device;
the at least one cable drum is arranged for winding up or unwinding a first cable which has a free end that is anchored at an anchoring point on the gripping arms, and at least one cable drum is arranged for winding up or unwinding a second cable and a third cable, each having free ends anchored to the comb; and
the cable winch arrangement comprises a first cable pulley which is displaceable along a displacement path for deflecting the first cable, and a displacement of the first cable pulley along the displacement path shifts the free end of the first cable relative to the free ends of the second and third cables to pivot the gripping arms between the closed and open states of the cleaning device.

12. The screen-cleaning apparatus according to claim 11, wherein the cable winch arrangement comprises a double cable pulley, and the first cable pulley is displaceable relative to the double cable pulley along the displacement path, such that the displacement of the first cable pulley along the displacement path relative to the double cable pulley shifts the free end of the first cable.

13. The screen-cleaning apparatus according to claim 12, wherein the cable winch arrangement includes a deflecting cable pulley which deflects the first cable between the double cable pulley and the anchoring point on the gripping arms.

14. The screen-cleaning apparatus according to claim 12, wherein the double cable pulley and the second cable pulleys are positionally fixed with respect to the supporting structure.

15. The screen-cleaning apparatus according to claim 12, wherein the first cable pulley is displaceable relative to the double cable pulley in a plane orientated orthogonally with respect to the drum axis.

16. The screen-cleaning apparatus according to claim 12, wherein the first cable runs from the cable drum into a first cable groove of the double cable pulley and runs out of the first cable groove in a direction towards the first cable pulley, and the first cable pulley deflects the first cable into a second cable groove of the double cable pulley.

17. The screen-cleaning apparatus according to claim 11, wherein the cable winch arrangement includes two second cable pulleys for deflecting the second and the third cables anchored at the cleaning apparatus.

18. The screen-cleaning apparatus according to claim 11, wherein the first cable pulley is fixed relative to the supporting structure with respect to a direction parallel to the drum axis.

* * * * *